(12) United States Patent
Hazelton

(10) Patent No.: US 10,209,717 B2
(45) Date of Patent: Feb. 19, 2019

(54) AUTONOMOUS GUIDANCE SYSTEM

(71) Applicant: APTIV TECHNOLOGIES LIMITED, St. Michael (BB)

(72) Inventor: Lawrence Dean Hazelton, Goodrich, MI (US)

(73) Assignee: Aptiv Technologies Limited (BB)

( * ) Notice: Subject to any disclaimer, the term of this patent is extended or adjusted under 35 U.S.C. 154(b) by 15 days.

(21) Appl. No.: 15/545,944

(22) PCT Filed: Dec. 7, 2015

(86) PCT No.: PCT/US2015/064225
§ 371 (c)(1),
(2) Date: Jul. 24, 2017

(87) PCT Pub. No.: WO2016/126315
PCT Pub. Date: Aug. 11, 2016

(65) Prior Publication Data
US 2018/0004220 A1    Jan. 4, 2018

Related U.S. Application Data

(60) Provisional application No. 62/112,770, filed on Feb. 6, 2015.

(51) Int. Cl.
| | |
|---|---|
| *G05D 1/02* | (2006.01) |
| *G01S 7/41* | (2006.01) |
| *G01S 13/86* | (2006.01) |
| *G01S 13/93* | (2006.01) |

(52) U.S. Cl.
CPC ............ *G05D 1/0246* (2013.01); *G01S 7/412* (2013.01); *G01S 13/867* (2013.01); *G01S 13/931* (2013.01); *G05D 1/0257* (2013.01); *G01S 2013/9392* (2013.01); *G05D 2201/0213* (2013.01)

(58) Field of Classification Search
CPC .. G05D 1/0246; G05D 1/0257; G01S 13/867; G01S 7/412; G01S 13/931
USPC .......................................................... 701/28
See application file for complete search history.

(56) References Cited

U.S. PATENT DOCUMENTS

| | | | |
|---|---|---|---|
| 6,526,352 B1 * | 2/2003 | Breed ................ | G01C 21/3697 342/357.31 |
| 8,199,046 B2 | 6/2012 | Nanami | |
| 2009/0140887 A1 * | 6/2009 | Breed .................. | G01C 21/165 340/990 |
| 2010/0013615 A1 * | 1/2010 | Hebert ................... | B60Q 9/006 340/425.5 |

(Continued)

FOREIGN PATENT DOCUMENTS

WO    2009/070069 A1    6/2009

*Primary Examiner* — Yazan A Soofi
(74) *Attorney, Agent, or Firm* — Lawrence D. Hazelton

(57) ABSTRACT

An autonomous guidance system that operates a vehicle in an autonomous mode includes a camera module, a radar module, and a controller. The camera module outputs an image signal indicative of an image of an object in an area about a vehicle. The radar module outputs a reflection signal indicative of a reflected signal reflected by the object. The controller determines an object-location of the object on a map of the area based on a vehicle-location of the vehicle on the map, the image signal, and the reflection signal. The controller classifies the object as small when a magnitude of the reflection signal associated with the object is less than a signal-threshold.

5 Claims, 3 Drawing Sheets

(56) References Cited

U.S. PATENT DOCUMENTS

| | | |
|---|---|---|
| 2014/0032093 A1 | 1/2014 | Mills |
| 2015/0019080 A1* | 1/2015 | Schneider .............. B60W 30/12 |
| | | 701/41 |

* cited by examiner

AUTONOMOUS GUIDANCE SYSTEM

CROSS-REFERENCE TO RELATED APPLICATION

This application claims the benefit under 35 U.S.C. § 371 of published PCT Patent Application Number PCT/US2015/64255, filed 7 Dec. 2015 and published as WO2016/126315 on 11 Aug. 2016, which claims the benefit under 35 U.S.C. § 119(e) of U.S. Provisional Patent Application No. 62/112,770, filed 6 Feb. 2015, the entire disclosure of which is hereby incorporated herein by reference.

TECHNICAL FIELD OF INVENTION

This disclosure generally relates to an autonomous guidance system, and more particularly relates to a controller that classifies the object as small when a magnitude of a radar reflection signal associated with the object is less than a signal-threshold.

BACKGROUND OF INVENTION

Autonomous guidance systems that operate vehicles in an autonomous mode have been proposed. However, many of these systems rely on detectable markers in the roadway so the system can determine where to steer the vehicle. Vision based systems that do not rely on detectable markers but rather rely on image processing to guide the vehicle have also been proposed. However image based systems require critical alignment of the camera in order to reliably determine distance to objects.

SUMMARY OF THE INVENTION

In accordance with one embodiment, an autonomous guidance system that operates a vehicle in an autonomous mode is provided. The system includes a camera module, a radar module, and a controller. The camera module outputs an image signal indicative of an image of an object in an area about a vehicle. The radar module outputs a reflection signal indicative of a reflected signal reflected by the object. The controller determines an object-location of the object on a map of the area based on a vehicle-location of the vehicle on the map, the image signal, and the reflection signal. The controller classifies the object as small when a magnitude of the reflection signal associated with the object is less than a signal-threshold.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
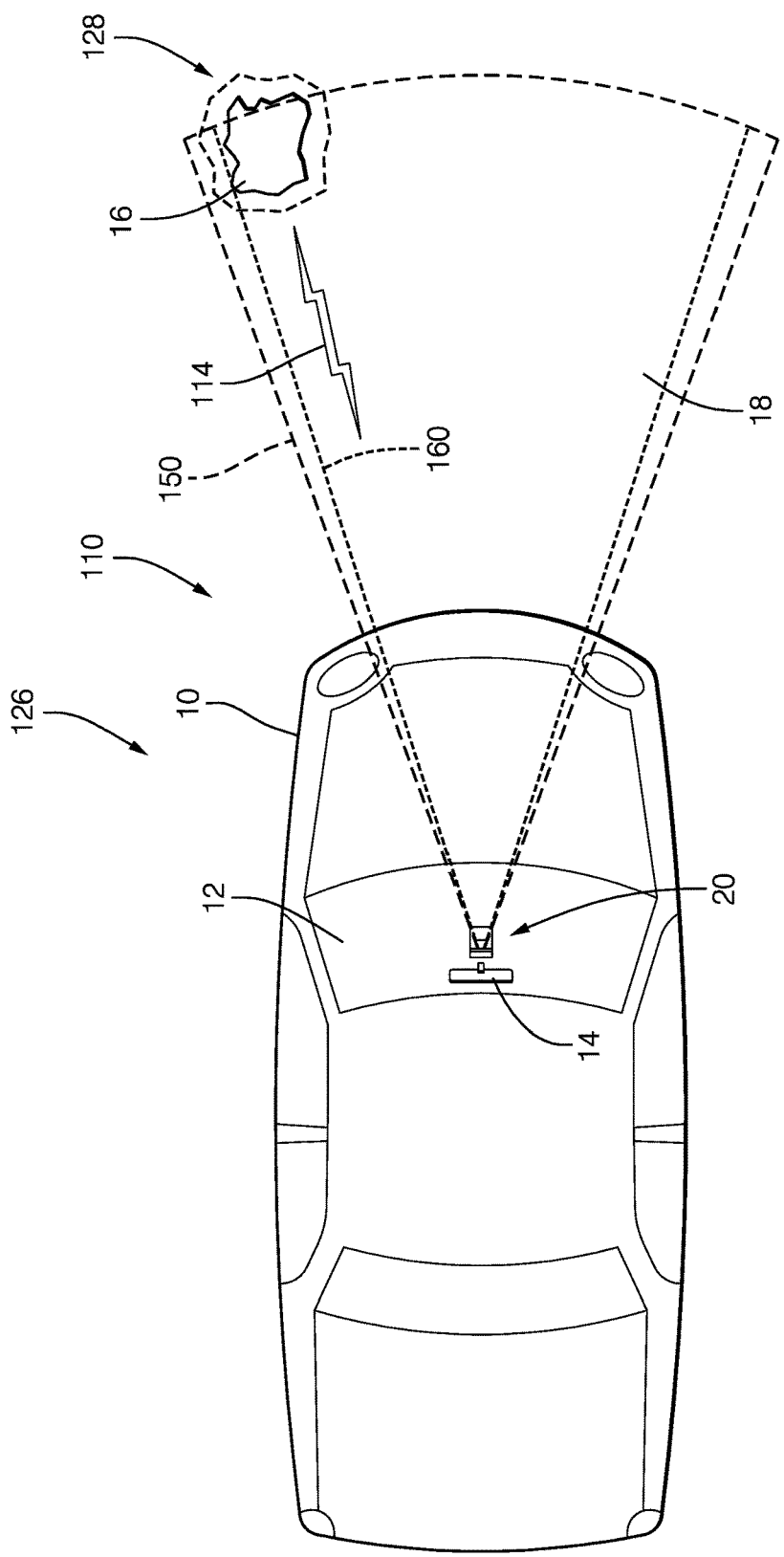
FIG. 1 is a top view of a vehicle equipped with an autonomous guidance system that includes a sensor assembly, according to one embodiment.

FIG. 1 illustrates a non-limiting example of an autonomous guidance system, hereafter referred to as the system 110, which operates a vehicle 10 in an autonomous mode that autonomously controls, among other things, the steering-direction, and the speed of the vehicle 10 without intervention on the part of an operator (not shown). In general, the means to change the steering-direction, apply brakes, and control engine power for the purpose of autonomous vehicle control are known so these details will not be explained herein. The disclosure that follows is general directed to how radar and image processing can be cooperatively used to improve autonomous control of the vehicle 10, in particular how maps used to determine where to steer the vehicle can be generated, updated, and otherwise improved for autonomous vehicle guidance.

The vehicle 10 is equipped with a sensor assembly, hereafter the assembly 20, which is shown in this example located in an interior compartment of the vehicle 10 behind a window 12 of the vehicle 10. While an automobile is illustrated, it will be evident that the assembly 20 may also be suitable for use on other vehicles such as heavy duty on-road vehicles like semi-tractor-trailers, and off-road vehicles such as construction equipment. In this non-limiting example, the assembly 20 is located behind the windshield and forward of a rearview mirror 14 so is well suited to detect an object 16 in an area 18 forward of the vehicle 10. Alternatively, the assembly 20 may be positioned to 'look' through a side or rear window of the vehicle 10 to observe other areas about the vehicle 10, or the assembly may be integrated into a portion of the vehicle body in an unobtrusive manner. It is emphasized that the assembly 20 is advantageously configured to be mounted on the vehicle 10 in such a way that it is not readily noticed. That is, the assembly 20 is more aesthetically pleasing than previously proposed autonomous systems that mount a sensor unit in a housing that protrudes above the roofline of the vehicle on which it is mounted. As will become apparent in the description that follows, the assembly 20 includes features particularly directed to overcoming problems with detecting small objects.

Figure 2:
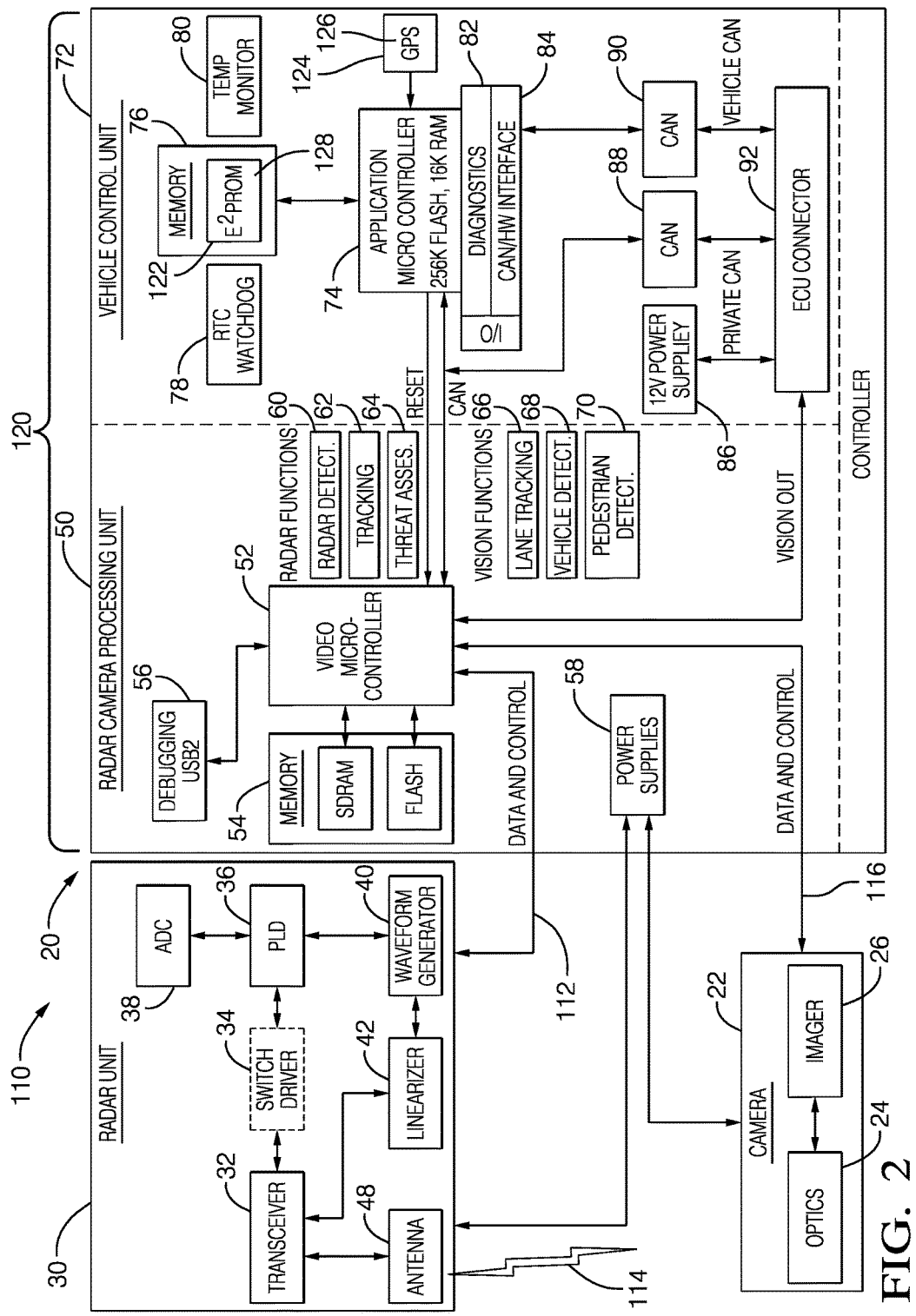
FIG. 2 is a block diagram of the assembly of FIG. 1, according to one embodiment.

FIG. 2 illustrates a non-limiting example of a block diagram of the system 110, i.e. a block diagram of the assembly 20. The assembly 20 may include a controller 120 that may include a processor such as a microprocessor or other control circuitry such as analog and/or digital control circuitry including an application specific integrated circuit (ASIC) for processing data as should be evident to those in the art. The controller 120 may include memory, including non-volatile memory, such as electrically erasable programmable read-only memory (EEPROM) for storing one or more routines, thresholds and captured data. The one or more routines may be executed by the processor to perform steps for determining if signals received by the controller 120 for detecting the object 16 as described herein.

The controller 120 includes a radar module 30 for transmitting radar signals through the window 12 to detect an object 16 through the window 12 and in an area 18 about the vehicle 10. The radar module 30 outputs a reflection signal 112 indicative of a reflected signal 114 reflected by the object 16. In the example, the area 18 is shown as generally forward of the vehicle 10 and includes a radar field of view defined by dashed lines 150. The radar module 30 receives reflected signal 114 reflected by the object 16 when the object 16 is located in the radar field of view.

The controller 120 also includes a camera module 22 for capturing images through the window 12 in a camera field of view defined by dashed line 160. The camera module 22 outputs an image signal 116 indicative of an image of the object 16 in the area about a vehicle. The controller 120 is generally configured to detect one or more objects relative to the vehicle 10. Additionally, the controller 120 may have further capabilities to estimate the parameters of the detected object(s) including, for example, the object position and velocity vectors, target size, and classification, e.g., vehicle verses pedestrian. In additional to autonomous driving, the assembly 20 may be employed onboard the vehicle 10 for automotive safety applications including adaptive cruise control (ACC), forward collision warning (FCW), and collision mitigation or avoidance via autonomous braking and lane departure warning (LDW).

The controller 120 or the assembly 20 advantageously integrates both radar module 30 and the camera module 22 into a single housing. The integration of the camera module 22 and the radar module 30 into a common single assembly (the assembly 20) advantageously provides a reduction in sensor costs. Additionally, the camera module 22 and radar module 30 integration advantageously employs common or shared electronics and signal processing as shown in FIG. 2. Furthermore, placing the radar module 30 and the camera module 22 in the same housing simplifies aligning these two parts so a location of the object 16 relative to the vehicle 10 base on a combination of radar and image data (i.e.—radar-camera data fusion) is more readily determined.

Figure 3:
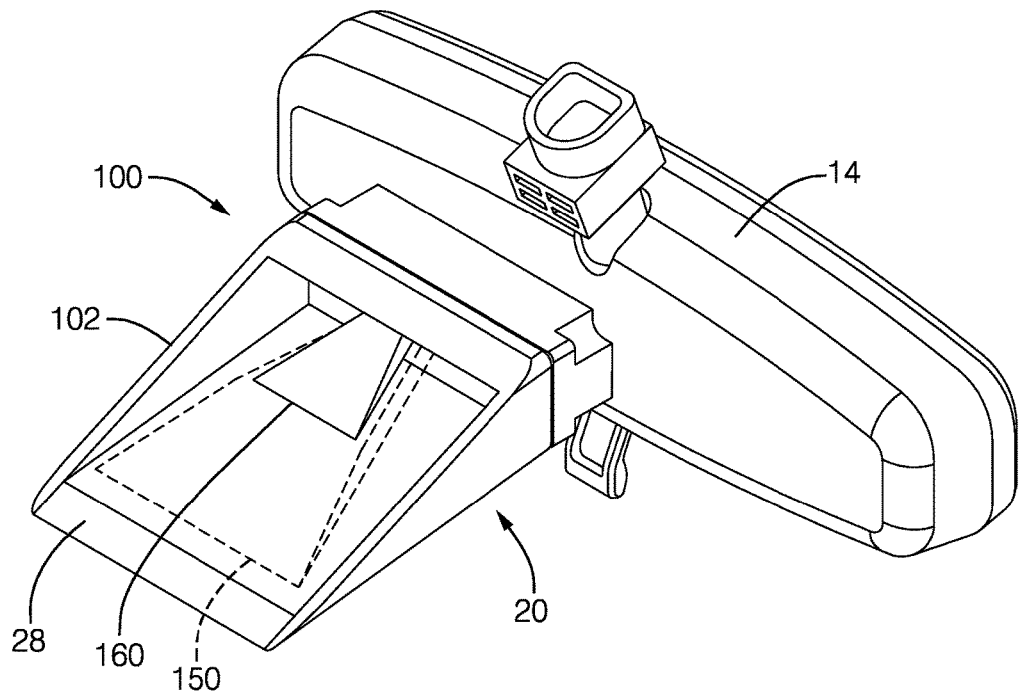
FIG. 3 is a perspective view of the assembly of FIG. 1, according to one embodiment.
Figure 4:
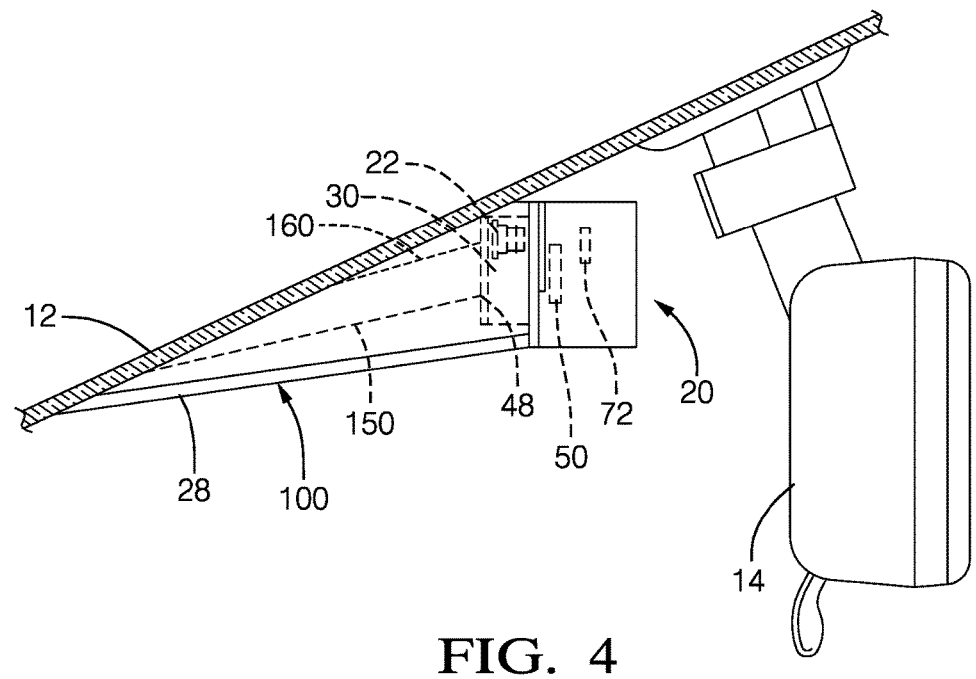
FIG. 4 is a side view of the assembly of FIG. 1, according to one embodiment.

The assembly 20 may advantageously employ a housing 100 comprising a plurality of walls as shown in FIGS. 3 and 4, according to one embodiment. The controller 120 that may incorporate a radar-camera processing unit 50 for processing the captured images and the received reflected radar signals and providing an indication of the detection of the presence of one or more objects detected in the coverage zones defined by the dashed lines 150 and the dashed lines 160.

The controller 120 may also incorporate or combine the radar module 30, the camera module 22, the radar-camera processing unit 50, and a vehicle control unit 72. The radar module 30 and camera module 22 both communicate with the radar-camera processing unit 50 to process the received radar signals and camera generated images so that the sensed radar and camera signals are useful for various radar and vision functions. The vehicle control unit 72 may be integrated within the radar-camera processing unit or may be separate therefrom. The vehicle control unit 72 may execute any of a number of known applications that utilize the processed radar and camera signals including, but not limited to autonomous vehicle control, ACC, FCW, and LDW.

The camera module 22 is shown in FIG. 2 including both the optics 24 and an imager 26. It should be appreciated that the camera module 22 may include a commercially available off the shelf camera for generating video images. For example, the camera module 22 may include a wafer scale camera, or other image acquisition device. Camera module 22 receives power from the power supply 58 of the radar-camera processing unit 50 and communicates data and control signals with a video microcontroller 52 of the radar-camera processing unit 50.

The radar module 30 may include a transceiver 32 coupled to an antenna 48. The transceiver 32 and antenna 48 operate to transmit radar signals within the desired coverage zone or beam defined by the dashed lines 150 and to receive reflected radar signals reflected from objects within the coverage zone defined by the dashed lines 150. The radar module 30 may transmit a single fan-shaped radar beam and form multiple receive beams by receive digital beam-forming, according to one embodiment. The antenna 48 may include a vertical polarization antenna for providing vertical polarization of the radar signal which provides good propagation over incidence (rake) angles of interest for the windshield, such as a seventy degree)(70°) incidence angle. Alternately, a horizontal polarization antenna may be employed; however, the horizontal polarization is more sensitive to the RF properties and parameters of the windshield for high incidence angle.

The radar module 30 may also include a switch driver 34 coupled to the transceiver 32 and further coupled to a programmable logic device (PLD 36). The programmable logic device (PLD) 36 controls the switch driver in a manner synchronous with the analog-to-digital converter (ADC 38) which, in turn, samples and digitizes signals received from the transceiver 32. The radar module 30 also includes a waveform generator 40 and a linearizer 42. The radar module 30 may generate a fan-shaped output which may be achieved using electronic beam forming techniques. One example of a suitable radar sensor operates at a frequency of 76.5 gigahertz. It should be appreciated that the automotive radar may operate in one of several other available frequency bands, including 24 GHz ISM, 24 GHz UWB, 76.5 GHz, and 79 GHz.

The radar-camera processing unit 50 is shown employing a video microcontroller 52, which includes processing circuitry, such as a microprocessor. The video microcontroller 52 communicates with memory 54 which may include SDRAM and flash memory, amongst other available memory devices. A device 56 characterized as a debugging USB2 device is also shown communicating with the video microcontroller 52. The video microcontroller 52 communicates data and control with each of the radar module 30 and camera module 22. This may include the video microcontroller 52 controlling the radar module 30 and camera module 22 and includes receiving images from the camera module 22 and digitized samples of the received reflected radar signals from the radar module 30. The video microcontroller 52 may process the received radar signals and camera images and provide various radar and vision functions. For example, the radar functions executed by video microcontroller 52 may include radar detection 60, tracking 62, and threat assessment 64, each of which may be implemented via a routine, or algorithm. Similarly, the video microcontroller 52 may implement vision functions including lane tracking function 66, vehicle detection 68, and pedestrian detection 70, each of which may be implemented via routines or algorithms. It should be appreciated that the video microcontroller 52 may perform various functions related to either radar or vision utilizing one or both of the outputs of the radar module 30 and camera module 22.

The vehicle control unit 72 is shown communicating with the video microcontroller 52 by way of a controller area network (CAN) bus and a vision output line. The vehicle control unit 72 includes an application microcontroller 74 coupled to memory 76 which may include electronically erasable programmable read-only memory (EEPROM), amongst other memory devices. The memory 76 may also be used to store a map 122 of roadways that the vehicle 10 may travel. As will be explained in more detail below, the map 122 may be created and or modified using information obtained from the radar module 30 and/or the camera module 22 so that the autonomous control of the vehicle 10 is improved. The vehicle control unit 72 is also shown including an RTC watchdog 78, temperature monitor 80, and input/output interface for diagnostics 82, and CAN/HW interface 84. The vehicle control unit 72 includes a twelve volt (12 V) power supply 86 which may be a connection to the vehicle battery. Further, the vehicle control unit 72 includes a private CAN interface 88 and a vehicle CAN interface 90, both shown connected to an electronic control unit (ECU) that is connected to an ECU connector 92. Those in the art will recognize that vehicle speed, braking, steering, and other functions necessary for autonomous operation of the vehicle 10 can be performed by way of the ECU connector 92.

The vehicle control unit 72 may be implemented as a separate unit integrated within the assembly 20 or may be located remote from the assembly 20 and may be implemented with other vehicle control functions, such as a vehicle engine control unit. It should further be appreciated that functions performed by the vehicle control unit 72 may be performed by the video microcontroller 52, without departing from the teachings of the present invention.

The camera module 22 generally captures camera images of an area in front of the vehicle 10. The radar module 30 may emit a fan-shaped radar beam so that objects generally in front of the vehicle reflect the emitted radar back to the sensor. The radar-camera processing unit 50 processes the radar and vision data collected by the corresponding camera module 22 and radar module 30 and may process the information in a number of ways. One example of processing of radar and camera information is disclosed in U.S. Patent Application Publication No. 2007/0055446, which is assigned to the assignee of the present application, the disclosure of which is hereby incorporated herein by reference.

Referring to FIGS. 3 and 4, the assembly 20 is generally illustrated having a housing 100 containing the various components thereof. The housing 100 may include a polymeric or metallic material having a plurality of walls that generally contain and enclose the components therein. The housing 100 has an angled surface 102 shaped to conform to the interior shape of the window 12. Angled surface 102 may be connected to window 12 via an adhesive, according to one embodiment. According to other embodiments, housing 100 may otherwise be attached to window 12 or to another location behind the window 12 within the passenger compartment of the vehicle 10.

The assembly 20 has the camera module 22 generally shown mounted near an upper end and the radar module 30 is mounted below. However, the camera module 22 and radar module 30 may be located at other locations relative to each other. The radar module 30 may include an antenna 48 that is vertical oriented mounted generally at the forward side of the radar module 30 for providing a vertical polarized signal. The antenna 48 may be a planar antenna such as a patch antenna. A glare shield 28 is further provided shown as a lower wall of the housing 100 generally below the camera module 22. The glare shield 28 generally shields light reflection or glare from adversely affecting the light images received by the camera module 22. This includes preventing glare from reflecting off of the vehicle dash or other components within the vehicle and into the imaging view of the camera module 22. Additionally or alternately, an electromagnetic interference (EMI) shield may be located in front or below the radar module 30. The EMI shield may generally be configured to constrain the radar signals to a generally forward direction passing through the window 12, and to prevent or minimize radar signals that may otherwise pass into the vehicle 10. It should be appreciated that the camera module 22 and radar module 30 may be mounted onto a common circuit board which, in turn, communicates with the radar-camera processing unit 50, all housed together within the housing 100.

Described above is an autonomous guidance system (the system 110) that operates a vehicle 10 in an autonomous mode. The system 110 includes a camera module 22 and a radar module 30. The camera module 22 outputs an image signal 116 indicative of an image of an object 16 in the area 18 about a vehicle 10. The radar module 30 outputs a reflection signal 112 indicative of a reflected signal 114 reflected by the object 16. The controller 120 may be used to generate from scratch and store a map 122 of roadways traveled by the vehicle 10, and/or update a previously stored/generated version of the map 122. The controller 120 may include a global-positioning-unit, hereafter the GPS 124 to provide a rough estimate of a vehicle-location 126 of the vehicle 10 relative to selected satellites (not shown).

As will become clear in the description that follows, the system 110 advantageously is able to accurately determine an object-location 128 of the object 16 relative to the vehicle 10 so that small objects that are not normally included in typical GPS based maps can be avoided by the vehicle when being autonomously operated. By way of example and not limitation, the object 16 illustrated in FIG. 1 is a small mound in the roadway, the kind of which is sometimes used to designate a lane boundary at intersections. In this non-limiting example, the object 16 could be driven over by the vehicle 10 without damage to the vehicle 10. However, jostling of passengers by wheels of the vehicle 10 driving over the object 16 may cause undesirable motion of the vehicle 10 that may annoy passengers in the vehicle 10, or possibly spill coffee in the vehicle 10. Another example of a small object that may warrant some action on the part of an autonomous driving system is a rough rail-road crossing, where the system 110 may slow the vehicle 10 shortly before reaching the rail-road crossing.

In one embodiment, the controller 120 is configured to generate the map 122 of the area 18 based on the vehicle-location 126 of the vehicle 10. That is, the controller 120 is not preloaded with a predetermined map such as those provided with a typical commercially available navigation assistance device. Instead, the controller 120 builds or generates the map 122 from scratch based on, the image signal 116, and the reflection signal 112 and global position coordinates provide by the GPS 124. For example, the width of the roadways traveled by the vehicle 10 may be determined from the image signal 116, and various objects such as signs, bridges, buildings, and the like may be recorded or classified by a combination of the image signal 116 and the reflection signal.

Typically, vehicle radar systems ignore small objects detected by the radar module 30. By way of example and not limitation, small objects include curbs, lamp-posts, mail-boxes, and the like. For general navigation systems, these small objects are typically not relevant to determining when the next turn should be made an operator of the vehicle. However, for an autonomous guidance system like the system 110 described herein, prior knowledge of small targets can help the system keep the vehicle 10 centered in a roadway, and can indicate some unexpected small object as a potential threat if an unexpected small object is detected by the system 110. Accordingly, the controller 120 may be configured to classify the object 16 as small when a magnitude of the reflection signal 112 associated with the object 16 is less than a signal-threshold. The system may also be configured to ignore an object classified as small if the object is well away from the roadway, more than five meters (5 m) for example.

In an alternative embodiment, the controller 120 may be preprogrammed or preloaded with a predetermined map such as those provided with a typical commercially available navigation assistance device. However, as those in the art will recognize that such maps typically do not include information about all objects proximate to a roadway, for example, curbs, lamp-posts, mail-boxes, and the like. The controller 120 may be configured or programmed to determine the object-location 128 of the object 16 on the map 122 of the area 18 based on the vehicle-location 126 of the vehicle 10 on the map 122, the image signal 116, and the reflection signal 112. That is, the controller 120 may add details to the preprogrammed map in order to identify various objects to assist the system 110 avoid colliding with various objects and keep the vehicle 10 centered in the lane or roadway on which it is traveling. As mention before, prior radar based system may ignore small objects. However, in this example, the controller 120 classifies the object as small when the magnitude of the reflection signal 112 associated with the object 16 is less than a signal-threshold. Accordingly, small objects such as curbs, lamp-posts, mail-boxes, and the like can be remembered by the system 110 to help the system 110 safely navigate the vehicle 10.

It is contemplated that the accumulation of small objects in the map 122 will help the system 110 more accurately navigate a roadway that is traveled more than once. That is, the more frequently a roadway is traveled, the more detailed the map 122 will become as small objects that were previously ignored by the radar module 30 are now noted and classified as small. It is recognized that some objects are so small that it may be difficult to distinguish an actual small target from noise. As such, the controller may be configured to keep track of each time a small object is detected, but not add that small object to the map 122 until the small object has been detected multiple times. In other words, the controller classifies the object 16 as verified if the object 16 is classified as small and the object 16 is detected a plurality of occasions that the vehicle 10 passes through the area 18. It follows that the controller 120 adds the object 16 to the map 122 after the object 16 is classified as verified after having been classified as small.

Instead of merely counting the number of times an object that is classified as small is detected, the controller 120 may be configured or programmed to determine a size of the object 16 based on the image signal 116 and the reflection signal 112, and then classify the object 16 as verified if the object is classified as small and a confidence level assigned to the object 16 is greater than a confidence-threshold, where the confidence-threshold is based on the magnitude of the reflection signal 112 and a number of occasions that the object is detected. For example, if the magnitude of the reflection signal 112 is only a few percent below the signal-threshold used to determine that an object is small, then the object 16 may be classified as verified after only two or three encounters. However, if the magnitude of the reflection signal 112 is more than fifty percent below the signal-threshold used to determine that an object is small, then the object 16 may be classified as verified only after many encounter, eight encounters for example. As before, the controller 120 then adds the object 16 to the map 122 after the object 16 is classified as verified.

Other objects may be classified based on when they appear. For example, if the vehicle autonomously travels the same roadway every weekday to, for example, convey a passenger to work, objects such garbage cans may appear adjacent to the roadway on one particular day, Wednesday for example. The controller 120 may be configured to log the date, day of the week, and/or time of day that an object is encountered, and then look for a pattern so the presence of that object can be anticipated in the future and the system 110 can direct the vehicle 10 to give the garbage can a wide berth.

Accordingly, an autonomous guidance system (the system 110), and a controller 120 for the system 110 is provided. The controller 120 learns the location of small objects that are not normally part of navigation maps but are a concern when the vehicle 10 is being operated in an autonomous mode. If a weather condition such as snow obscures or prevents the detection of certain objects by the camera module 22 and/or the radar module 30, the system 110 can still direct the vehicle 10 to avoid the object 16 because the object-location 128 relative to other un-obscured objects is present in the map 122.

While this invention has been described in terms of the preferred embodiments thereof, it is not intended to be so limited, but rather only to the extent set forth in the claims that follow.

I claim:

1. An autonomous guidance system that operates a vehicle in an autonomous mode, said system comprising:
   a camera module that outputs an image signal indicative of an image of an object in an area about a vehicle;
   a radar module that outputs a reflection signal indicative of a reflected signal reflected by the object; and
   a controller that determines an object-location of the object on a predetermined map of roadways proximate to the area based on a vehicle-location of the vehicle on the predetermined map, the image signal, and the reflection signal, wherein the controller classifies the object as small when a magnitude of the reflection signal associated with the object is less than a signal-threshold, and the object is not indicated on the predetermined map.

2. The system in accordance with claim 1, wherein the controller classifies the object as verified if the object is classified as small and the object is detected a plurality of occasions that the vehicle passes through the area.

3. The system in accordance with claim 2, wherein the controller adds the object to the predetermined map after the object is classified as verified.

4. The system in accordance with claim 1, wherein the controller determines a size of the object based on the image signal and the reflection signal, and classifies the object as verified if the object is classified as small and a confidence level assigned to the object is greater than a confidence-threshold, wherein the confidence-threshold is based on the magnitude of the reflection signal and a number of occasions that the object is detected.

5. The system in accordance with claim 4, wherein the controller adds the object to the predetermined map after the object is classified as verified.

* * * * *